May 29, 1962  N. E. LA MANTIA  3,037,144
AUTOMATIC AUTOMOBILE LIGHTING SYSTEM
Filed June 3, 1959
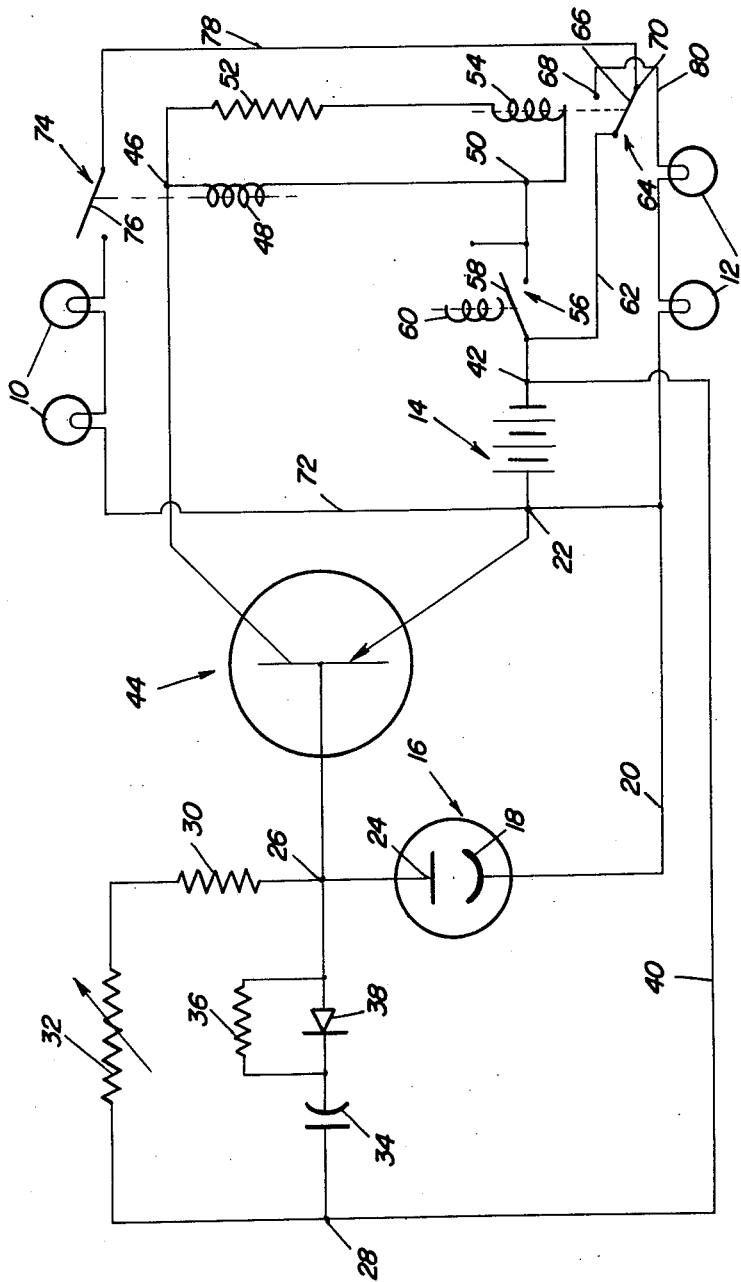
Norman E. La Mantia
INVENTOR.

United States Patent Office 3,037,144
Patented May 29, 1962

3,037,144
AUTOMATIC AUTOMOBILE LIGHTING SYSTEM
Norman E. La Mantia, 3512 Flower, Phoenix, Ariz.
Filed June 3, 1959, Ser. No. 817,835
6 Claims. (Cl. 315—82)

This invention relates generally to automobile lighting systems and more particularly to an automatic control circuit therefor.

Every motorist will readily recall experiences during which he inadvertently forgot to extinguish automobile lights upon emerging from the vehicle. It is well-known, of course, that automobile headlights, or even parking lights, will run down the automobile battery if allowed to remain energized. In view of this, automobile lighting systems are often electrically connected in a circuit which includes the ignition switch so that upon removal of the ignition key from the switch, the lights will automatically be extinguished. An associated problem involving automobile lighting systems, involves the failure of motorists to light their headlights and parking lights when necessary. Often, automobiles may be seen on the roads whose drivers have inadvertently failed to switch on the lighting system. Of course, it is realized that the absence of proper lighting of an automobile presents a safety hazard to the occupants of the unlighted automobile and all other cars in the proximity thereof. Therefore, it is thought that the development of control means for automatically lighting the parking lights or headlights dependent on the needs would be desirable.

In accordance with the above, it is the principal object of this invention to provide control means for automatically lighting parking lights or headlights of an automobile dependent upon the ambient light intensity.

It is a further object of this invention to provide novel control means for automatically lighting the lights of an automobile lighting system as needed, which includes a light sensitive element exposed to the ambient light, for electrically controlling selective relays which in turn properly connect the parking and headlights of an automobile to an electric source, preferably the automobile battery.

It is a more particular object of this invention to provide control means for automobile lighting systems which includes a light sensitive element characterized by having an electrical resistance which varies inversely proportionally to the light intensity to which the element is exposed.

The light sensitive element forms a portion of a differentiating circuit whose output is impressed upon a transistor amplifier circuit for controlling a relay and switching means.

It is a still more particular object of this invention to provide novel control means for automobile lighting systems which includes first and second relay coils having first and second switches associated therewith. The first switch is a single-pole single-throw switch serially connected between the parking lights and an electrical source while a second switch is a double-pole double-throw switch selectively serially connected between the electrical source and either the headlights or parking lights.

The second relay coil has a resistor connected in series therewith and the resistor-second relay coil combination is electrically connected in parallel with the first relay coil so that a higher voltage across the parallel combination will be required to actuate the second relay coil than the first relay coil. Since the resistance of the light sensitive element increases as the ambient light intensity decreases, the amplifier is so connected that its output increases as the resistance increases whereby as daylight turns into darkness, the parking lights are initially energized and the headlights thereafter energized as the parking lights become extinguished.

It is a still further object of this invention to provide novel control means for an automobile lighting system which are relatively simple, inexpensive, and reliable.

Other objects and advantages which will become subsequently apparent reside in the details of construction and operation as more fully hereinafter described and claimed, reference being had to the accompanying drawings forming a part hereof, wherein like numerals refer to like parts throughout, and in which:

The FIGURE is a schematic diagram illustrating the control circuit contemplated for utilization in an automobile for automatically controlling the light system thereof.

The numeral 10 designates conventional parking lights of an automobile while numeral 12 schematically represents the headlights thereof. The numeral 14 indicates a conventional storage battery, preferably the automobile battery.

In accordance with the teachings of the invention, a light sensitive element 16, preferably a cadmium sulfide photocell, is carried by the automobile and exposed to the ambient light. The cadmium sulfide photocell 16 is characterized by its action of possessing a minimum electrical resistance in high intensity light and a maximum electrical resistance in low intensity light. The cathode 18 of the photocell 16 is connected through a conductor 20 to a terminal 22 connected to the positive side of the battery 14. The plate 24 of the photocell 16 is connected to terminal 26. A pair of parallel paths extend from terminal 26 to terminal 28. The first parallel path includes a fixed resistance 30 and a variable resistance 32 serially connected and of course could be, in actuality, a single variable resistance having appropriate characteristics. The second parallel path between terminals 26 and 28 includes a capacitor 34 which is electrically connected in series with a parallel circuit consisting of a resistance 36 and a rectifier 38. The terminal 28 is connected through conductor 40 to the terminal 42 electrically connected to the negative side of the battery 14.

A transistor amplifier 44 includes a base, a collector, and an emitter. As will be noted from the drawing, the base of the amplifier 44 is electrically connected to the terminal 26 while the emitter is electrically connected to the terminal 22. The collector is connected to the terminal 46 and a pair of parallel paths extend therefrom. The initial parallel path includes a first relay coil 48 connected to terminal 50. The second parallel path includes a resistor 52 serially connected with a second relay coil 54 connected to the terminal 50. A single-pole single-throw switch 56 has a movable contact 58 controlled by coil 60.

A conductor 62 connects terminal 42 with a double-throw switch 64 including a movable terminal 66 and a pair of fixed terminals 68 and 70. A conductor 72 extends from terminal 22, through the parking lights 10 to a single-pole single-throw switch 74 including a movable terminal 76 controlled by relay coil 48. The movable terminal 76 is connected through conductor 78 to fixed terminal 70 of switch 64. A conductor 80 connects fixed terminal 68 through headlights 12 to terminal 22. The movable terminal 66 of switch 64 is controlled by coil 54. The movable terminal 58 of switch 56 is controlled by coil 60.

Coil 60 is preferably connected between the generator and ground so that the switch 56 only closes after the engine is running and the generator generating. Therefore, it would not be possible to leave the lights energized all night unless the engine was left running also.

In the operation of the circuitry above described, it is to be noted that the cadmium sulfide photocell 16 has a minimum resistance in high intensity light and a maximum resistance in low intensity light. Since the photocell 16 is exposed to the ambient light, it will electrically reflect the outside light conditions. The voltage at the base of the transistor 44 can be seen to vary directly as the resistance across the photocell 16. In daylight, the resistance of the photocell 16 and therefore, the voltage at the base of the transistor 44, is at a minimum and the relay coils 48 and 54 will remain unenergized and the switches 64 and 74 will be in the positions illustrated. As the ambient light intensity decreases to a certain value to reduce the voltage at point 26 thereby increasing the forward bias of the emitter with respect to the base, first the parking light 10 will light as the relay coil 48 becomes energized to close switch 74 when the transistor becomes conductive. As the light intensity decreases further, the relay coil 54 will become energized to bring movable terminal 66 into contact with fixed terminal 68 to light the headlights and extinguish the parking lights 10.

The differentiating circuit including elements 36 and 34 enhances the operation of the circuit inasmuch as it enables the transistor 44 to energize the relay coils 48 and 54 more quickly in case of sudden darkness (entering a dark tunnel). The differentiating circuit is therefore operative to render the transistor instantaneously conductive in response to any abrupt decrease in voltage at point 26 before a forward bias of the emitter with respect to the base is established at the end of the response period of the photo cell 16, sufficient to then render the transistor conductive. Thus, the capacitor 34 is adjusted so as to instantaneously discharge through the by-pass resistor 36 in response to the abrupt reduction in voltage at 26 causing an instantaneous flow of current from point 28—42 and a reduction in potential on the collector of the transistor with respect to the emitter so as to render the transistor conductive to instantaneously establish flow of energizing current in the relay circuit. When the resistance valve of the photo cell reaches a stabilized value at the end of its response period, the transistor is maintained conductive by virtue of the then established bias of the emitter with respect to the base. Also, the transistor 44 is prevented from opening the relay too quickly in the event of sudden light (an approaching truck) since a resulting abrupt increase in current flow toward point 26 will be conducted through rectifier 38 to charge the capacitor 34 and thereby delay any corresponding increase in voltage at point 26 and hence also delay the restoration of the transistor 44 to its non-conductive state. It will further be appreciated that the variable resistance 32 allows the circuit to be adjustably set for energizing the lights at desired intensity levels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a variable resistance, a source of electrical energy, said photo conductive element and said variable resistance serially connected across said source, and a capacitive branch connected in parallel with said variable resistance, said capacitive branch including a capacitor connected in series with a resistor and a rectifier connected in parallel the forward rectifier resistance direction being from photo conductive element to capacitor and the reverse rectifier resistance being from capacitor to photo conductive element, an amplifier circuit, said amplifier circuit having an input electrically connected to the junction of said photo conductive element, variable resistance, and capacitive branch, said amplifier circuit having an output electrically connected to said relay and switching means, said relay and switching means including a first relay coil and a second relay coil, a first switch associated with said first coil and operative in response to the energization thereof, a second switch associated with said second coil and operative in response to the energization thereof.

2. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a variable resistance, a source of electrical energy, said photo conductive element and said variable resistance serially connected across said source, and a capacitive branch connected in parallel with said variable resistance, said capacitive branch including a capacitor connected in series with a resistor and a rectifier connected in parallel, the forward rectifier resistance direction being from photo conductive element to capacitor and the reverse rectifier resistance being from capacitor to photo conductive element, an amplifier circuit, said amplifier circuit having an input electrically connected to the junction of said photo conductive element, variable resistance, and capacitive branch, said amplifier circuit having an output electrically connected to said relay and switching means, said relay and switching means including a first relay coil and a second relay coil, a first switch associated with said first coil and operative in response to the energization thereof, a second switch associated with said second coil and operative in response to the energization thereof, said first and second relay coils connected to parallel means electrically associated with said coils for energizing said second coil upon the impression of a greater voltage than required by said first coil.

2. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a variable resistance, a source of electrical energy, said photo conductive element and said variable resistance serially connected across said source, and a capacitive branch connected in parallel with said variable resistance, said capacitive branch including a capacitor connected in series with a resistor and a rectifier connected in parallel the forward rectifier resistance direction being from photo conductive element to capacitor and the reverse rectifier resistance being from capacitor to photo conductive element, an amplifier circuit, said amplifier circuit having an input electrically connected to the junction of said photo conductive element, variable resistance, and capacitive branch, said amplifier circuit having an output electrically connected to said relay and switching means, said relay and switching means including a first relay coil and a second relay coil, a first switch associated with said first coil and operative in response to the energization thereof, a second switch associated with said second coil and operative in response to the energization thereof, said first and second relay coils connected to parallel means electrically associated with said coils for energizing said second coil upon the impression of a greater voltage than required by said first coil, said first switch being a single pole single-throw switch serially connected between a source of electrical energy and said parking lights, said second switch being a double-throw switch including a movable terminal and a pair of fixed terminals, a first of said pair of fixed terminals connected to said parking lights, a second of said pair of fixed terminals connected to said headlights, said movable terminal connected to a source of electrical energy.

4. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a source of electrical energy, an amplifier circuit, said amplifier circuit having an input electrically connected to said photo conductive element, and capacitive circuit means serially connected to said photo conductive element across said source controlling the rate of voltage change to said amplifier input, said capacitive circuit means including a serially connected capacitor and rectifier with said rectifier connected so the forward rectifier resistance is from the photo conductive element to the capacitor and the reverse rectifier resistance is from the capacitor to the photo conductive element, said relay and switching means including a first relay coil and a second relay coil, a first switch associated with said first coil and operative in response to the energization thereof, a second switch associated with said second coil and operative in response to the energization thereof.

5. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a source of electrical energy, an amplifier circuit, said amplifier circuit having an input electrically connected to said photo conductive element, and capacitive circuit means serially connected to said photo conductive element across said source controlling the rate of voltage change to said amplifier input, said capacitive circuit means including a serially connected capacitor and rectifier with said rectifier connected so the forward rectifier resistance is from the photo conductive element to the capacitor and the reverse rectifier resistance is from the capacitor to the photo conductive element, said relay and switching means including a first relay coil and a second relay coil, a first switch associated with said first coil and operative in response to the energization thereof, a second switch associated with said second coil and operative in response to the energization thereof, said first and second relay coils connected to parallel means electrically associated with said coils for energizing said second coil upon the impression of a greater voltage than required by said first coil.

6. An automatic control circuit for an automobile lighting system including parking and headlights comprising ambient light sensing means and relay and switching means, said light sensing means operatively connected to said relay and switching means, said relay and switching means operatively connected to said parking and headlights for energizing said parking lights during high levels of dim ambient light and said headlights during low levels of dim ambient light, said light sensing means including a photo conductive light sensitive element characterized by an electrical resistance which varies inversely with respect to the ambient light, a source of electrical energy, an amplifier circuit, said amplifier circuit having an input electrically connected to said photo conductive element, and capacitive circuit means serially connected to said photo conductive element across said source controlling the rate of voltage change to said amplifier input, said capacitive circuit means including a serially connected capacitor and rectifier with said rectifier connected so the forward rectifier resistance is from the photo conductive element to the capacitor and the reverse rectifier resistance is from the capacitor to the photo conductive element, said relay and switching means including a first relay coil and a second relay coil, a first switch associated with said first coil and operative in response to the energization thereof, a second switch associated with said second coil and operative in response to the energization thereof, said first and second relay coils connected to parallel means electrically associated with said coils for energizing said second coil upon the impression of a greater voltage than required by said first coil, said first switch being a single pole single-throw switch serially connected between a source of electrical energy and said parking lights, said second switch being a double-throw switch including a movable terminal and a pair of fixed terminals, a first of said pair of fixed terminals connected to said parking lights, a second of said pair of fixed terminals connected to said headlights, said movable terminal connected to a source of electrical energy.

References Cited in the file of this patent

UNITED STATES PATENTS

| | | |
|---|---|---|
| 1,981,985 | Braselton | Nov. 27, 1934 |
| 2,039,230 | Lamb | Apr. 28, 1936 |
| 2,888,611 | Matkins | May 26, 1959 |
| 2,931,944 | Admiraal et al. | Apr. 5, 1960 |